No. 774,893. PATENTED NOV. 15, 1904.
A. RIEBE.
BALL BEARING.
APPLICATION FILED JULY 26, 1901.
NO MODEL.

Attest:
A. N. Jesbera
John M. Scoble

Inventor:
August Riebe
by Redding, Kiddle & Greeley
Attys.

No. 774,893. Patented November 15, 1904.

UNITED STATES PATENT OFFICE.

AUGUST RIEBE, OF BERLIN, GERMANY, ASSIGNOR TO THE FIRM OF DEUTSCHE WAFFEN- & MUNITIONSFABRIKEN OF BERLIN, OF BERLIN, GERMANY.

BALL-BEARING.

SPECIFICATION forming part of Letters Patent No. 774,893, dated November 15, 1904.

Application filed July 26, 1901. Serial No. 69,805. (No model.)

*To all whom it may concern:*

Be it known that I, AUGUST RIEBE, a subject of the German Emperor, residing in Berlin, Germany, have invented certain new and useful Improvements in Ball-Bearings, of which the following is a specification, reference being had to the accompanying drawings, forming a part hereof.

This invention relates to ball-bearings in which a plurality of free balls are provided in a ball-raceway.

As is well known, in ball-bearings the separate balls wear away unequally either in consequence of differences in the material, in their formation, or of other circumstances more particularly caused by the construction and use of the bearing. This varying wearing away and inequality in the diameters are, however, a considerable drawback in those bearings in which the load acts vertically to the plane of the ball-race. In fact, as free balls in consequence of their unequal diameter have unequal speeds it happens that the larger overruns the smaller, exerts a pressure, and thereby causes a sliding friction.

The object of this invention is to provide a ball-bearing in which the tendency of the balls to unequal speeds may be overcome. In order to prevent this drawback in ball-bearings, more particularly step-bearings, an important improvement, which forms the object of the present application, is adopted, as may be seen from the accompanying drawings, in which—

Figure 1:
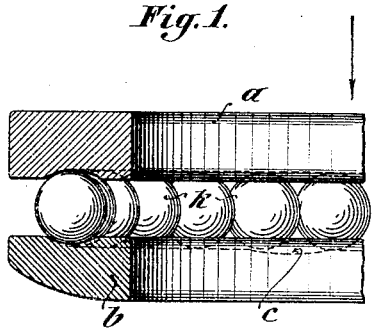
Figure 2:
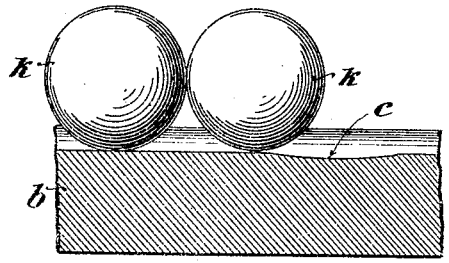

Figure 1 is an elevation and partial section, and Fig. 2 a detail, on an enlarged scale, of a step-bearing $a\,b$.

The race or track for the balls is provided at a suitable place with a relatively deep recess $c$. The balls $k$, passing this recess, are relieved of the weight, and by this relieving they receive an acceleration, and thereby escape from the pressure of the following ball $k$. With each revolution therefore any pressures which may have arisen are again relieved, and thus any permanent pressure and sliding friction between the separate balls is avoided.

What I claim is—

1. The combination of a ball-bearing having a ball-raceway, and a plurality of free balls in said raceway each of which normally bears a portion of the load, said raceway having a recess whereby each ball as it passes said recess is momentarily relieved of its load and given an acceleration to escape from the pressure of the following ball.

2. The combination of two rings forming a ball-raceway, and a plurality of free balls in said raceway each of which normally bears a portion of the load, one of said rings having a recess whereby each ball as it passes said recess is momentarily relieved of its load and given an acceleration to escape from the pressure of the following ball.

In witness whereof I have hereunto set my hand in presence of two witnesses.

AUGUST RIEBE.

Witnesses:
 HENRY HASPER,
 FRANK M. MASON.